(12) United States Patent
Maeda et al.

(10) Patent No.: US 7,293,168 B2
(45) Date of Patent: Nov. 6, 2007

(54) SYSTEM AND METHOD FOR INITIALLY CONFIGURING AND BOOTING A DEVICE USING A DEVICE IDENTIFIER

(75) Inventors: Masato Maeda, Issaquah, WA (US); Pui Keung Leung, Bellevue, WA (US); Gregory K. Sorknes, Mercer Island, WA (US); James Frederick Frye, Jr., Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 385 days.

(21) Appl. No.: 11/014,014

(22) Filed: Dec. 15, 2004

(65) Prior Publication Data

US 2006/0129788 A1 Jun. 15, 2006

(51) Int. Cl.
*G06F 15/177* (2006.01)
(52) U.S. Cl. .......................................... 713/1; 709/222
(58) Field of Classification Search .................... 713/1, 713/100; 709/221; 719/222
See application file for complete search history.

(56) References Cited

U.S. PATENT DOCUMENTS

| | | | |
|---|---|---|---|
| 6,633,978 B1 * | 10/2003 | Angelo et al. | 713/100 |
| 6,934,765 B2 * | 8/2005 | Held et al. | 709/245 |
| 6,954,852 B2 * | 10/2005 | Burokas et al. | 713/2 |
| 7,159,106 B2 * | 1/2007 | Meaney et al. | 713/2 |
| 2005/0149716 A1 * | 7/2005 | Nair et al. | 713/1 |

OTHER PUBLICATIONS

Microsoft Windows Server 2003 White Paper, "Automated Deployment Services Technical Overview," Published: Aug. 2003.

* cited by examiner

*Primary Examiner*—Thuan Du

(57) ABSTRACT

The unique identifier (UID) boot system provides a system and method for booting a network connected processing system. Briefly described, one embodiment is a method comprising receiving a UID, the UID uniquely identifying the network connected processing system; determining a directory structure from a first portion of the UID, the directory structure identifying a memory location in a network accessible memory wherein a UID script file resides, the UID script file comprising additional script that causes the network connected processing system to retrieve at least one resource information file; and determining a file name from a second portion of the UID, the file name identifying the UID script file.

32 Claims, 7 Drawing Sheets

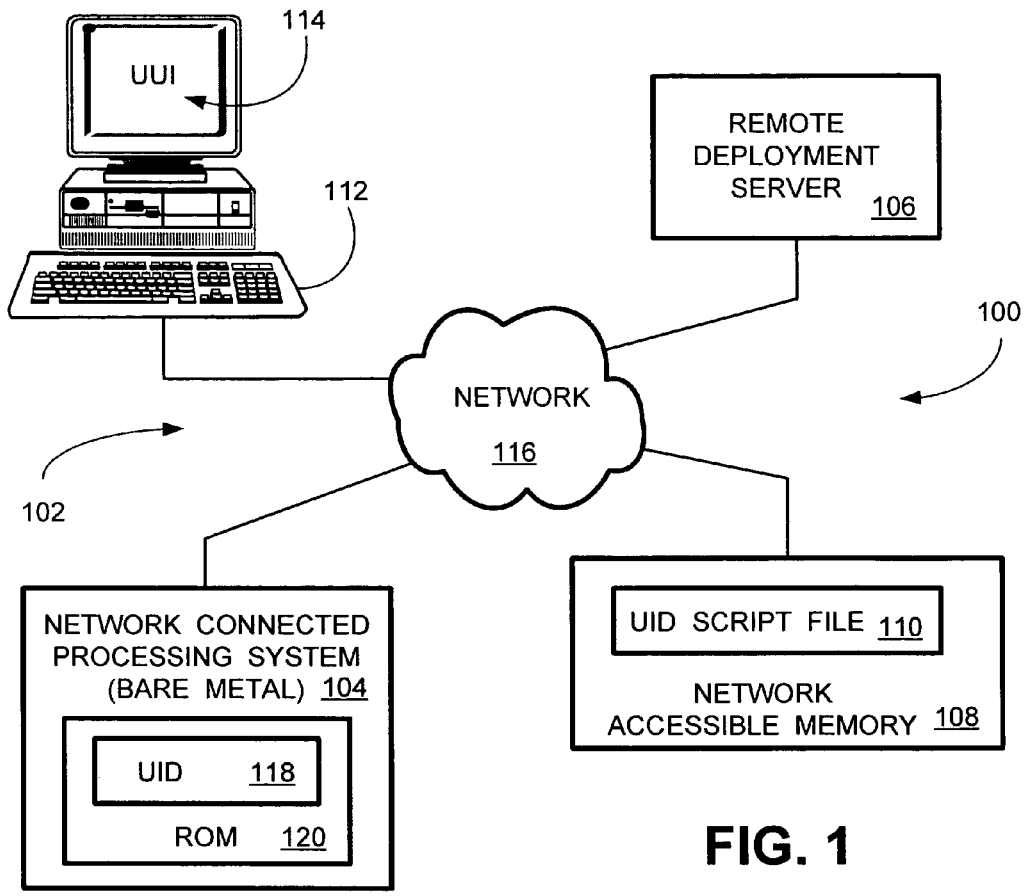
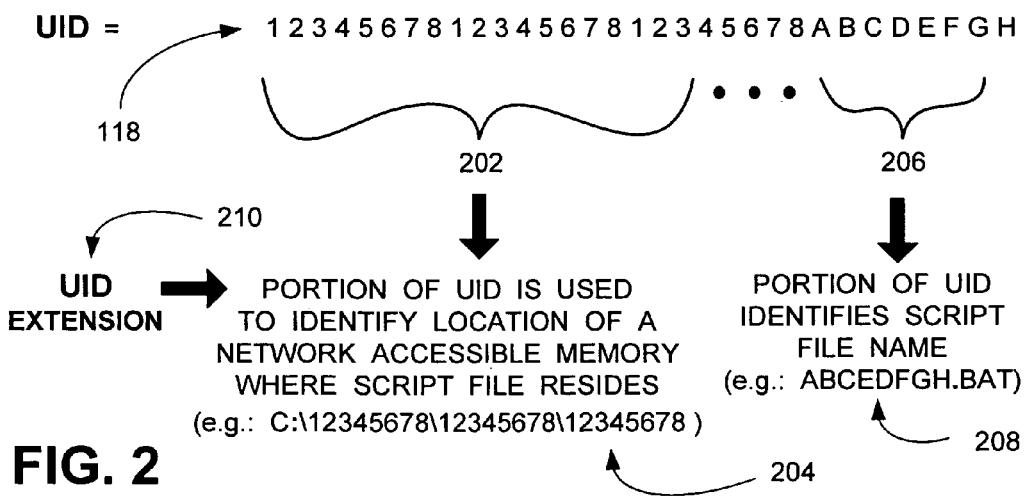

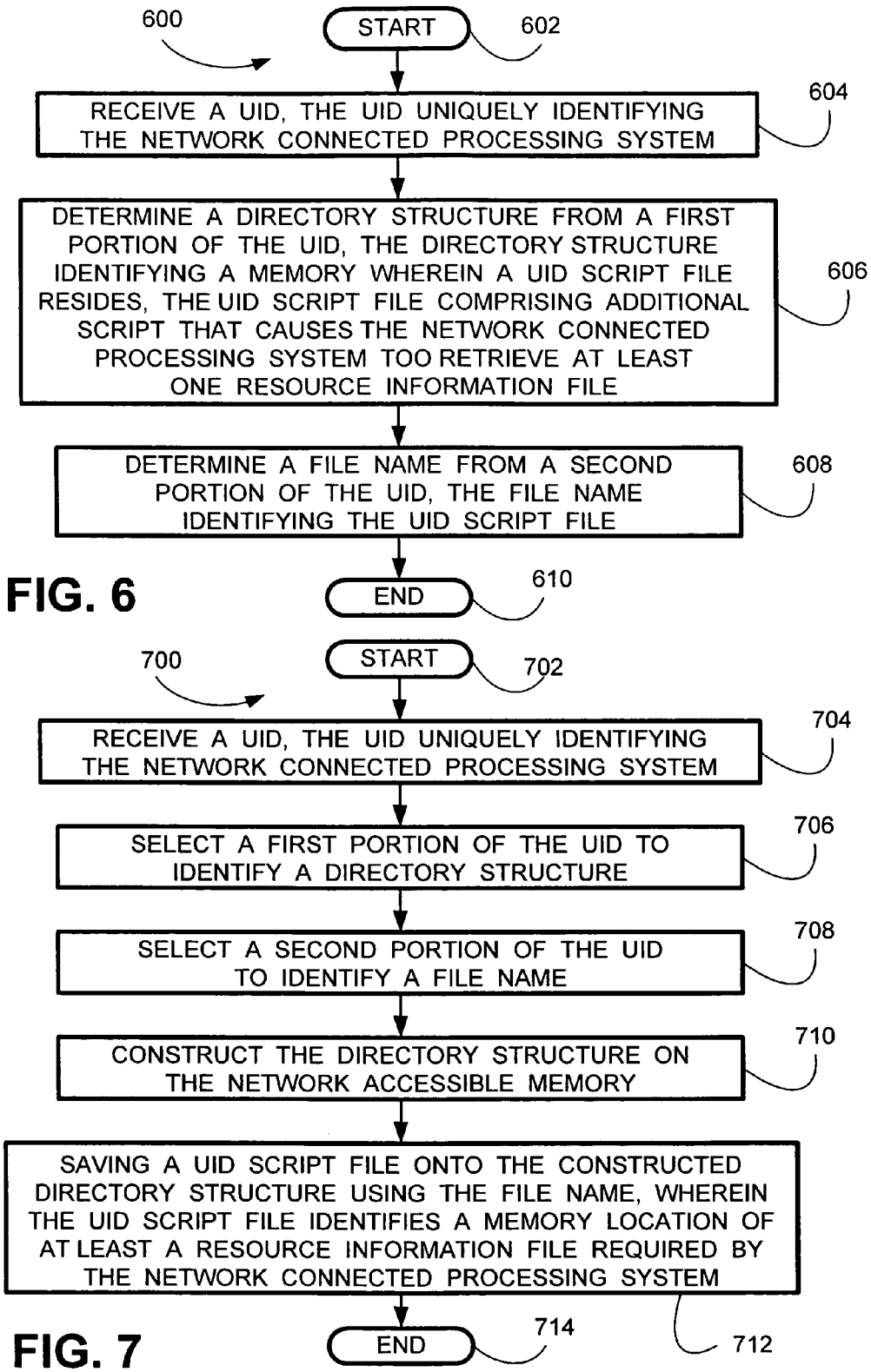

SYSTEM AND METHOD FOR INITIALLY CONFIGURING AND BOOTING A DEVICE USING A DEVICE IDENTIFIER

TECHNICAL FIELD

The present invention is generally related to processing systems and, more particularly, is related to a system and method for initially configuring and booting a device using the device identifier.

BACKGROUND

Network connected processing systems, such as a server-based system, perform a boot process when the processing system is initially powered up for operation. During the boot process, the operating system used by the network connected processing system is retrieved from a memory device, such as a disk drive or the like. One example of such an operating system is the well known "disk operation system" (DOS). Once the operating system has been retrieved, loaded, and is properly executing, the network connected processing system can then be used for its intended purpose.

To initiate the boot process, power is applied to the processor residing in the network connected processing system. That is, the boot process is initiated by turning on the processing system. The network connected processing system retrieves from a nonvolatile memory a System Management Basic Input/Output System (SMBIOS) program, which is part of the Basic Input/Output System (BIOS) program. The SMBIOS is an extended BIOS interface that enables the network connected processing system to boot up the various devices, such as the network interface card (NIC), residing in the network connected processing system. NICs provide connectivity between the device in which it is installed and a communication system.

The nonvolatile memory wherein the SMBIOS resides is typically a limited capacity, solid-state memory that is directly coupled to, or that is part of, the processor. One example of a nonvolatile solid-state memory is the Read-Only Memory (ROM).

Network connected processing systems, when initially connected to the network, may not include an operating system loaded onto the device's hard drive memory. Also, the hard drive is typically not formatted. Such devices may be referred to as "bare metal" devices or "bare metal" computer systems.

If the network connected processing system is to be initially booted from a remote server, a Pre-Boot Execution Environment (PXE) is used to enable connectivity of the network connected processing system to other network connected devices, including the booting server. During the initial boot process, the BIOS prompts for a signal that causes the PXE to execute. The PXE causes a "virtual image" to be retrieved from a remote device, such as the device initiating the boot process, so that the various system devices are discovered and configured. The retrieved virtual image simulates information on a disk. A script specifying connectivity parameters for the various devices used by the network connected processing system is provided in the virtual image.

Construction of the virtual image, and the process of successfully completing the initial boot process from a remote server, is a time consuming process because a complex set of boot instructions must be generated for each type of network connected processing system. Because of the many different types of network connected processing systems, the initial booting of a plurality of different types of network connected processing systems becomes even more time consuming since each type of network connected processing system will require construction and maintenance of a unique virtual image. Thus, it is desirable to provide a management tool to facilitate remote initial booting of a plurality of different network connected processing systems using a remote network server.

SUMMARY

The unique identifier (UID) boot system provides a system and method for initially configuring and booting a network connected processing system. Briefly described, one embodiment is a method comprising receiving a UID, the UID uniquely identifying the network connected processing system; determining a directory structure from a first portion of the UID, the directory structure identifying a memory location in a network accessible memory wherein a UID script file resides, the UID script file comprising additional script that causes the network connected processing system to retrieve at least one resource information file; and determining a file name from a second portion of the UID, the file name identifying the UID script file.

BRIEF DESCRIPTION OF THE DRAWINGS

The components in the drawings are not necessarily to scale relative to each other. Like reference numerals designate corresponding parts throughout the several views.

FIG. 1 is a block diagram illustrating a network environment wherein embodiments of the UID boot system is implemented.

FIG. 2 is an illustration of a unique identifier (UID) of the network connected processing system.

FIGS. 6-9 are flowcharts illustrating various embodiments of process for initially booting a device using the UID.

DETAILED DESCRIPTION

Figure 4:
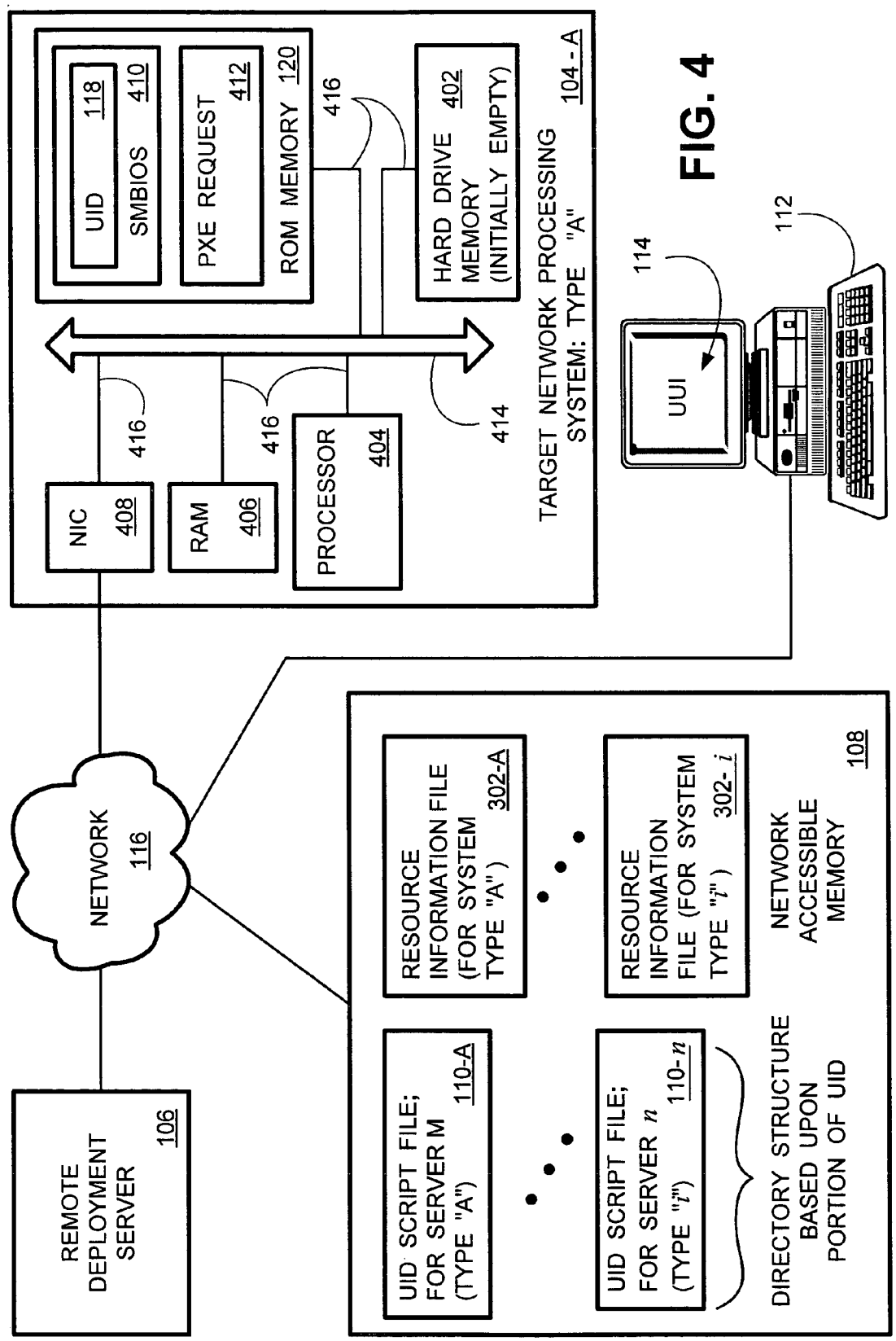
FIG. 4 is a block diagram illustrating in greater detail selected components of embodiments of a network accessible memory and an exemplary target network processing system (of type "A").

FIG. 1 is a block diagram illustrating a network environment 102 wherein embodiments of the unique identifier (UID) boot system 100 are implemented. The network environment 102 comprises a network connected processing system 104 that is to be initially booted, a remote deployment server 106 that initiates the initial boot process, a network accessible memory 108 where a UID script file 110 resides, a processing system 112 where UID user interface (UUI) 114 resides. Each of the above-described devices are communicatively coupled together via network 116. The network connected processing system 104 is denoted as "bare metal" because when initially connected to the network, network connected processing system 104 does not include an operating system loaded onto its hard drive memory 402 (FIG. 4). Also, the hard drive memory 402 may not be formatted.

The UID boot system 100 provides a system and method for associating the unique identifier (UID) 118 of the network connected processing system 104 with a file name and directory residing on the network accessible memory 108, such that the executing Pre-Boot Execution Environment (PXE) allows a pre-operating system (OS) program to locate and retrieve the remote UID script file 110. The UID script file 110 is a script-based, self-executing file that provides device specific configuration information for the network connected processing system 104.

The UID 118 may be a Universally Unique Identifier (UUID), a Globally Unique Identifier (GUID), or another unique identifier that is assigned to the target network connected processing system 104. This UID 118 may be assigned by the manufacturer or another entity. In the various embodiments, the UID 118 is "known" to the network connected processing system 104 before the start of the initial boot process. The UID 118 is also known to the administrator, as described hereinbelow.

During the initial boot process, the executing PXE retrieves a virtual image 534 (FIG. 5) from the remote deployment server 106 initiating the boot process. A UID Execution Command (UEC) 546 (FIG. 5) is embedded in the virtual image 534. The UEC 546 causes the retrieval of the UID 118 from the read-only memory (ROM) 120 residing in the target network connected processing system 104. In one embodiment, the UID 118 is stored into the ROM 120 by the manufacturer of the network connected processing system 104 and may be retrieved through SMBIOS programming calls.

The UEC 546 then uses a portion of the retrieved UID 118 to construct information identifying the directory where the UID script file 110 resides on the network accessible memory 108. Another portion of the retrieved UID 118 is used to construct the file name of the UID script file 110. Accordingly, since the precise location of the UID script file 110, and the name of the UID script file 110 is determined from the UID 118, the UID script file 110 is successfully accessed and retrieved by the network connected processing system 104 during the initial boot process.

Prior to initiating the initial boot process, the remote UID script file 110 is constructed. The UID script file 110 is a script-based type of script file. For example, the UID script file may be denoted with a file name extension of "bat" in one embodiment. The embedded script of the UID script file 110, when retrieved and executed by the network connected processing system 104 during the initial boot process, causes the network connected processing system 104 to retrieve the required resource information for the first time.

The retrieved configuration file or resource information (which are interchangeably referred to herein) may be deployed or captured. Capture is a process to generate a configuration file or resource information from a pre-configured system. Deployment is a process to apply the configuration file or resource information to the non-configured computer system.

The retrieved resource information is specific to the type of the network connected processing system 104. For example, the network connected processing system 104 may be a particular model of a network connected device that is provided by a manufacturer. Since there may be other network connected processing systems of different model types available from a manufacturer, and/or since other network connected processing systems may be made by different manufacturers, the resource information may have unique aspects for that network connected processing system 104.

Once the UID script file 110 has been constructed, a portion of the UID 118 is used to define a directory where the UID script file 110 will be stored into a network accessible memory 108. The administrator (not shown) constructing the directory knows the UID 118 since it is provided with the network connected processing system 104 when it is acquired from the manufacturer or a vendor. Another portion of the UID 118 will be used to define the name of the UID script file 110. The directory is then created on the network accessible memory 108, and the UID script file 110 is named using another portion of the UID 118. In one embodiment, the directory is created automatically by software. In another embodiment, the administrator creates the directory.

Then, the UID script file 110 is saved into the created directory using the defined file name. Since the directory and file name of the network accessible memory 108 matches the directory and file name that will be constructed by the UEC 546 (FIG. 5) when the network connected processing system 104 is initially booted, the UID script file 110 may be successfully accessed and retrieved by the network connected processing system 104 during the initial boot process.

FIG. 2 is an illustration of a hypothetical UID 118 of the network connected processing system 104 (FIG. 1). A portion 202 of the UID 118 defines a directory 204 (or directory structure) for a remote network accessible memory 108 (FIG. 1). Another portion 206 of the UID 118 defines a file name 208 of the UID script file 110 (FIG. 1) that is stored on the network accessible memory 108. The constructed directory 204 and file name 208 of the UID script file 110 are referred to herein as the UID extension 210.

In the hypothetical UID 118 of FIG. 2, the UID 118 is a unique 32 character identifier, such as the identifier used under the UID system. Other embodiments of the UID boot system 100 (FIG. 1) are configured to construct the directory 204 and file name 208 using other unique identifiers. The exemplary directory 204 indicates that the target directory constructed from the UID 118 is on the "C" drive of the network accessible memory 108, with a "sub-portion" of the UID 118 used to define a directory structure of "12345678" as the main directory. Another sub-portion of the UID 118 is used to define a first sub-level directory of "ABCDEFGH" as illustrated, and yet another sub-portion is used to define a second sub-level directory of as illustrated. The exemplary file name 208 of "ABCDEFGH.bat" is illustrated.

Eight characters for the directory names are used in the hypothetical example of FIG. 2 since the exemplary directory system is based upon the requirements of a disk operated system (DOS) that the exemplary directory 204 is based upon. If a DOS system is employed by the network accessible memory 108, fewer than eight characters may be used. A main directory and two sub-directories were used in the exemplary directory system. More than two sub-directories, or fewer than two sub-directories, may be constructed from the UID. Also, if a DOS system is employed by the network accessible memory 108, up to eight characters may be used for the file name. Also, other extensions of the file name (rather than the "bat" used in the exemplary file name) may be used.

If other operating systems are employed, other directory identification related requirements may be applicable. During the directory construction process, embodiments of the UID boot system 100 construct the directory system 204 and the file name 208 under applicable operating system requirements. Directory names and/or file names are constructed in accordance with specifications from the user, and/or from specifications in the UUI 114 (FIG. 1), described in greater detail below.

The above-described variations in the operating system, directory name and/or file names are permissible so long as the UEC 546 residing in the retrieved virtual image 534 (FIG. 5) constructs the intended directory names(s) and file name during the initial boot process. Furthermore, the portions 202 and 206 (FIG. 2) may use all of the available characters of a UID 118, may use fewer than all of the available characters, or may use common characters of the UID 118.

In one embodiment of a UID 118, some of the characters may indicate the type and/or model of the network connected processing system 104, and other characters may indicate a serial number of the network connected processing system 104. Thus, the administrator may select the characters corresponding to the type and/or model of the network connected processing system 104 to construct the directories and/or sub-directories 204, and select characters corresponding to the serial number to construct the file name 208.

Figure 3:
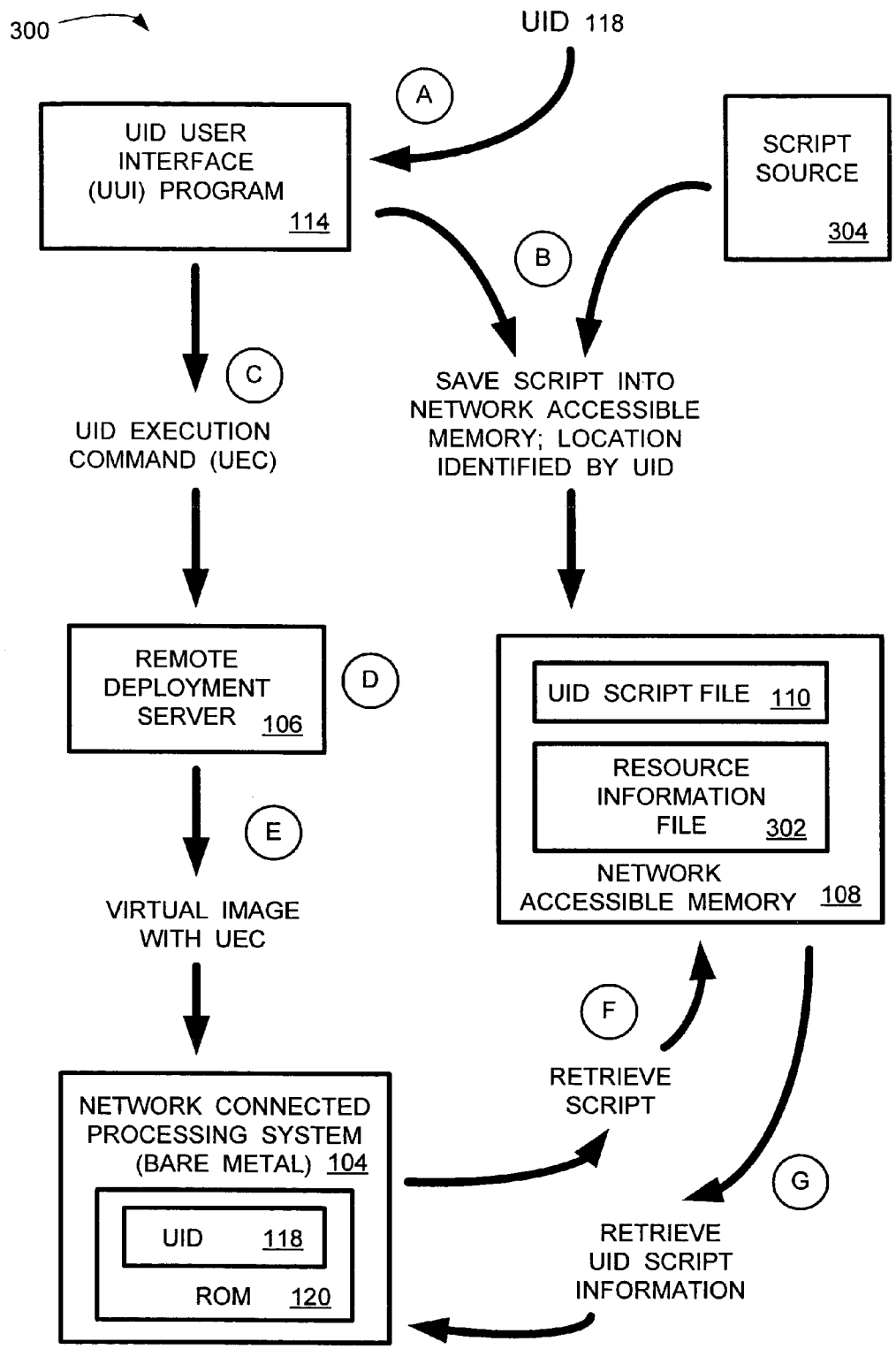
FIG. 3 is a block diagram illustrating an overview of a generic process employed by embodiments of a UID boot system.

FIG. 3 is a block diagram illustrating an overview process 300 employed by embodiments of a UID boot system 100 (FIG. 1). The overview process 300 is intended to generally describe how the UID 118 is used to configure the network connected processing system 104 during the initial boot process wherein the network connected processing system 104 is configured from a "bare metal" device into an active device. Additional detail of overview steps A-G is provided below.

Initially, the PXE request is initiated when the network connected processing system 104 initially powers up (in the bare metal condition). The remote deployment server 106 send the PXE software to the network connected processing system 104 and the PXE software begins self-executing on the target network connected processing system 104. Then, the network connected processing system 104 returns the UID 118 to the remote deployments server 106 and requests the virtual image.

Then, at Step A of FIG. 3, the UUI 114 retrieves the UID 118 during the initial PXE process via the remote deployment server. In one embodiment, the UID 118 is displayed to the administrator on a menu system (not shown). The UID 118 uniquely identifies the network connected processing system 104. [As noted above, the UID 118 is "known" to the network connected processing system 104 before the start of the initial boot process, and is known to the administrator.]

At Step B: the directory name(s) and file name are constructed by the UUI 114. Script is retrieved from a script source 304 such that the UID script file 110 is generated. Using the constructed directory structure and file name, the generated script file is saved into the network accessible memory 108. In some embodiments, a commonly named part of the UID may uniquely identify the network connected processing system 104 and other systems of the same type and/or model from a manufacturer.

At Step C: The UUI constructs a UID execution command (UEC), described in greater detail below. The UEC is then communicated to the remote deployment server 106. In other embodiments, steps B and C may be performed concurrently or in reverse order.

At Step D: The remote deployment server 106, in this example, executes a program that generates the virtual image. The UEC is embedded into the virtual image. Then, the boot process is initiated by the remote deployment server 106 such that the virtual image is communicated to the network connected processing system 104 as the PXE is executed.

At Step E: the network connected processing system 104, in response to instructions from the UEC embedded in the virtual image, retrieves the UID 118 from ROM 120. The UEC causes the network connected processing system 104 to construct the directory structure and file name from the retrieved UID 118.

At Step F: Once the directory structure and file name are constructed, the network connected processing system 104 accesses the network accessible memory 108 and retrieves the UID script file 110. The retrieved UID script file 110 then executes to further configure the network connected processing system 104.

At Step G: Then, the resource information file 302 for the network connected processing system 104 is retrieved such that the network connected processing system 104 configuration is completed. For example, the resource information residing in the resource information file 302 may be comprised of the hard drive partition instructions such that the hard drive memory 402 (FIG. 4) of the network connected processing system 104 is partitioned.

In one embodiment, a single resource information file 302 is retrieved. In other embodiments, the UID script file 110 causes a plurality of resource information files to be retrieved.

FIG. 4 is block diagram illustrating in greater detail selected components of embodiments of a network accessible memory 108 and an exemplary target network processing system 104-A (wherein the character "A" indicates that the exemplary target network processing system is of type "A"). The target network processing system 104-A comprises the above-described ROM memory 120, a hard drive memory 402, a processor 404, a random access memory (RAM) 406, and a network interface card (NIC) 408. ROM memory 120 comprises the System Management Basic Input/Output System 410 (SMBIOS) where the UID may reside, and a PXE request 412. NIC 408 provides connectivity between the target network processing system 104-A and network 116.

The above-described components are communicatively coupled together via communication bus 414, via connections 416. In alternative embodiments of network processing system 104-A, the above-described components are coupled in a different manner than illustrated in FIG. 4. For example, one or more of the above-described components may be directly coupled to processor 404 or may be coupled to processor 404 via intermediary components (not shown).

The exemplary network accessible memory 108 comprises a plurality of UID script files 110-A through 110-*n* (though only one UID script file may be used). Network accessible memory 108 also comprises a plurality of corresponding resource information files 302-A through 302-*i*. Here, the network administrator has constructed and stored configuration data for network connected processing systems of a type (type "A") that correspond to the target network processing system 104-A. As noted above, the resource information file 302-A may comprise the hard drive partition instructions and other information uniquely required for the target network processing system 104-A.

Resource information file 302-A may also be applicable to other type "A" network connected processing systems. Thus, once constructed and saved into the network accessible memory 108, the resource information file 302-A may be repeatedly used whenever another type "A" network connected processing system is initially booted. Furthermore, a plurality of resource information files (302-A through 302-*i*) may be stored in the network accessible memory 108 such that a particular resource information file may be retrieved by a corresponding network connected processing system when it is initially booted.

The unique UID script file 110-A also resides in the network accessible memory 108. The UID script file 110-A is uniquely constructed from the target network processing system 104-A, and is applicable only to the target network processing system 104-A. Other UID script files may be constructed by the administrator and saved into the network accessible memory 108. Accordingly, a plurality of network connected processing systems may be concurrently (or serially) booted by the remote deployment server 106 since each network connected processing system will uniquely retrieve its own unique UID script file. Furthermore, the concurrently/serially booted plurality of network connected processing systems need not be of the same type, since the unique UID script file causes retrieval of the configuration data file appropriate for that particular network connected processing system.

Figure 5:
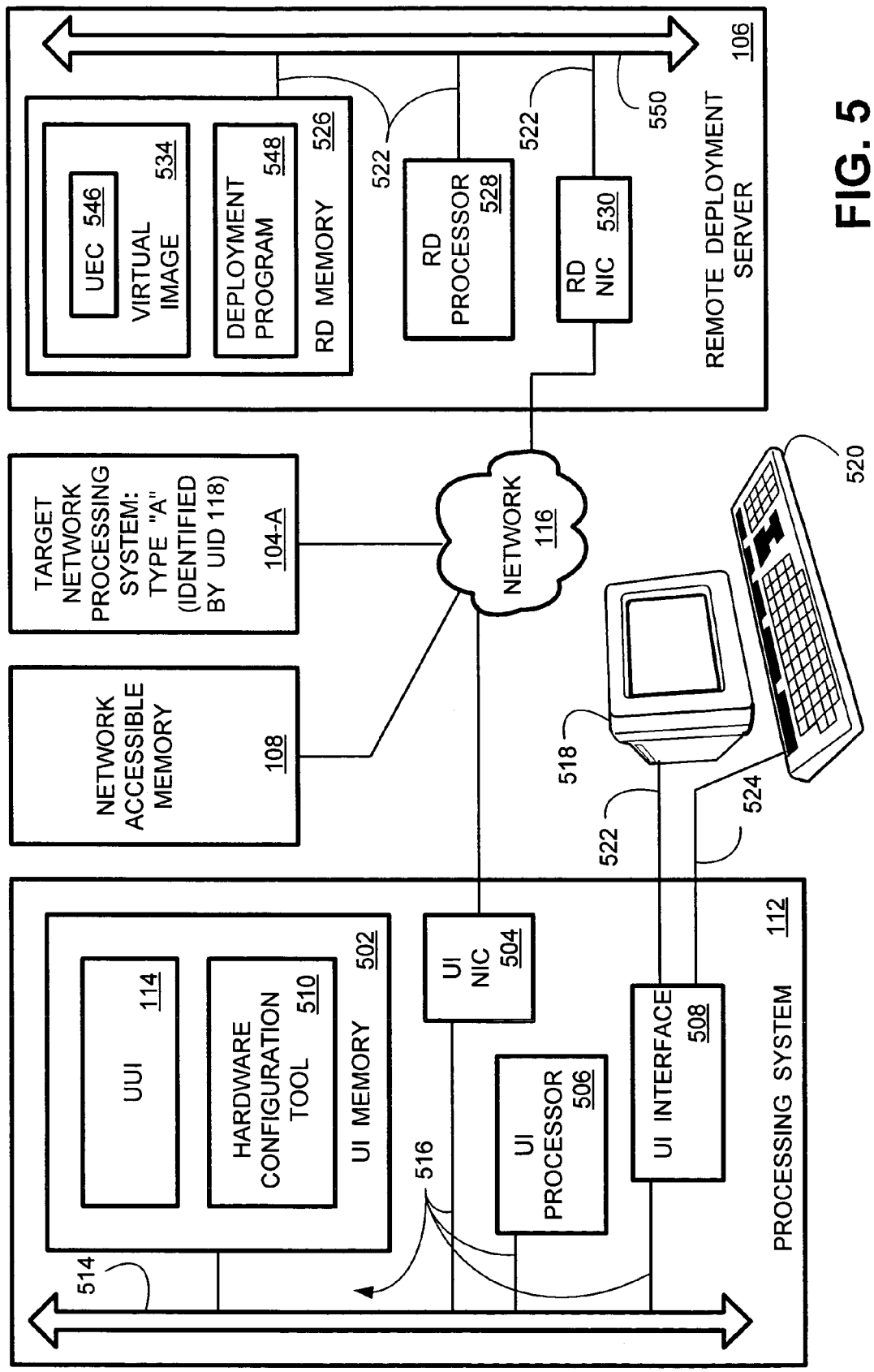
FIG. 5 is a block diagram illustrating in greater detail selected components of embodiments of a processing system and a remote deployment server.
Figure 8:
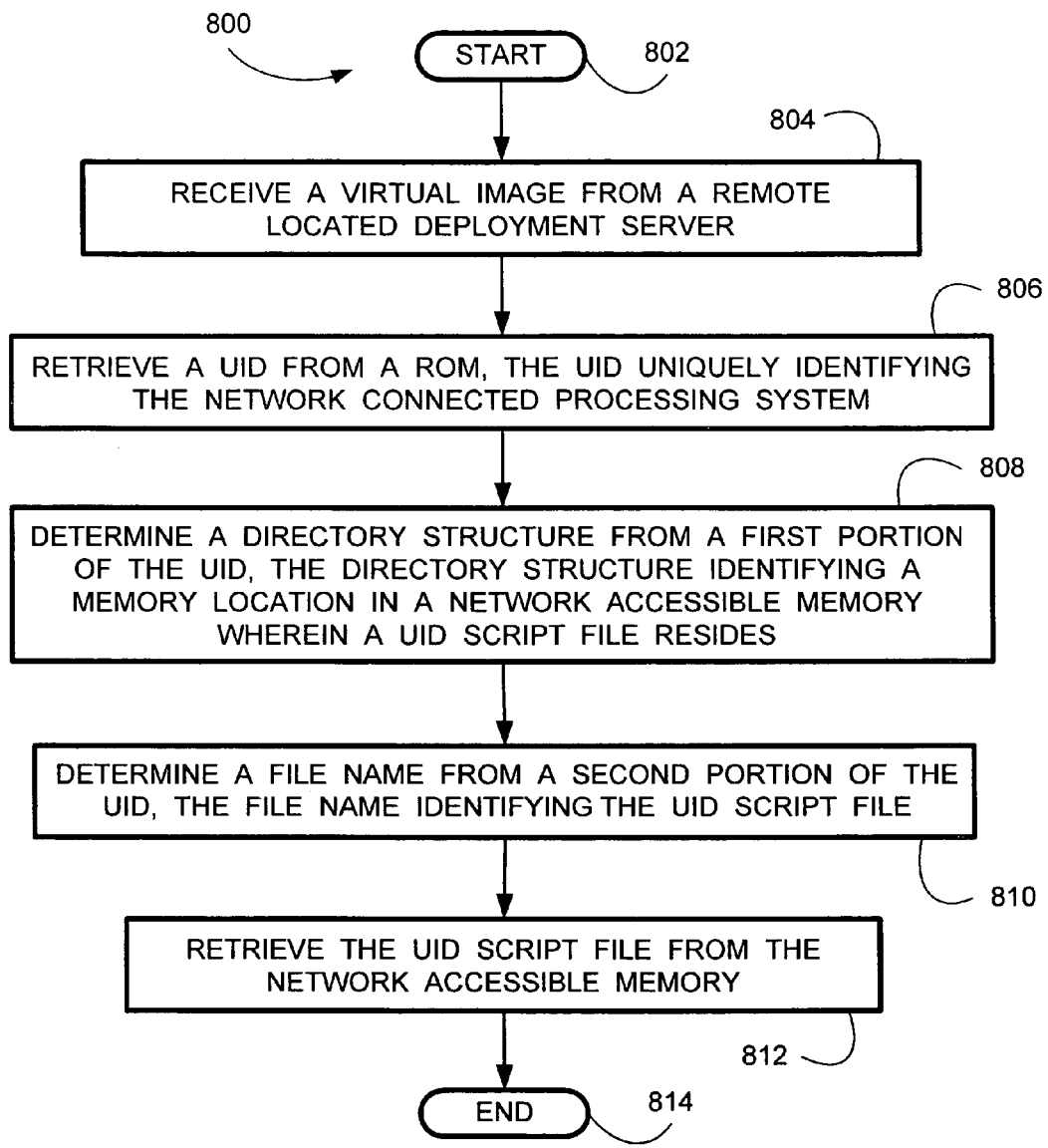
Figure 9:
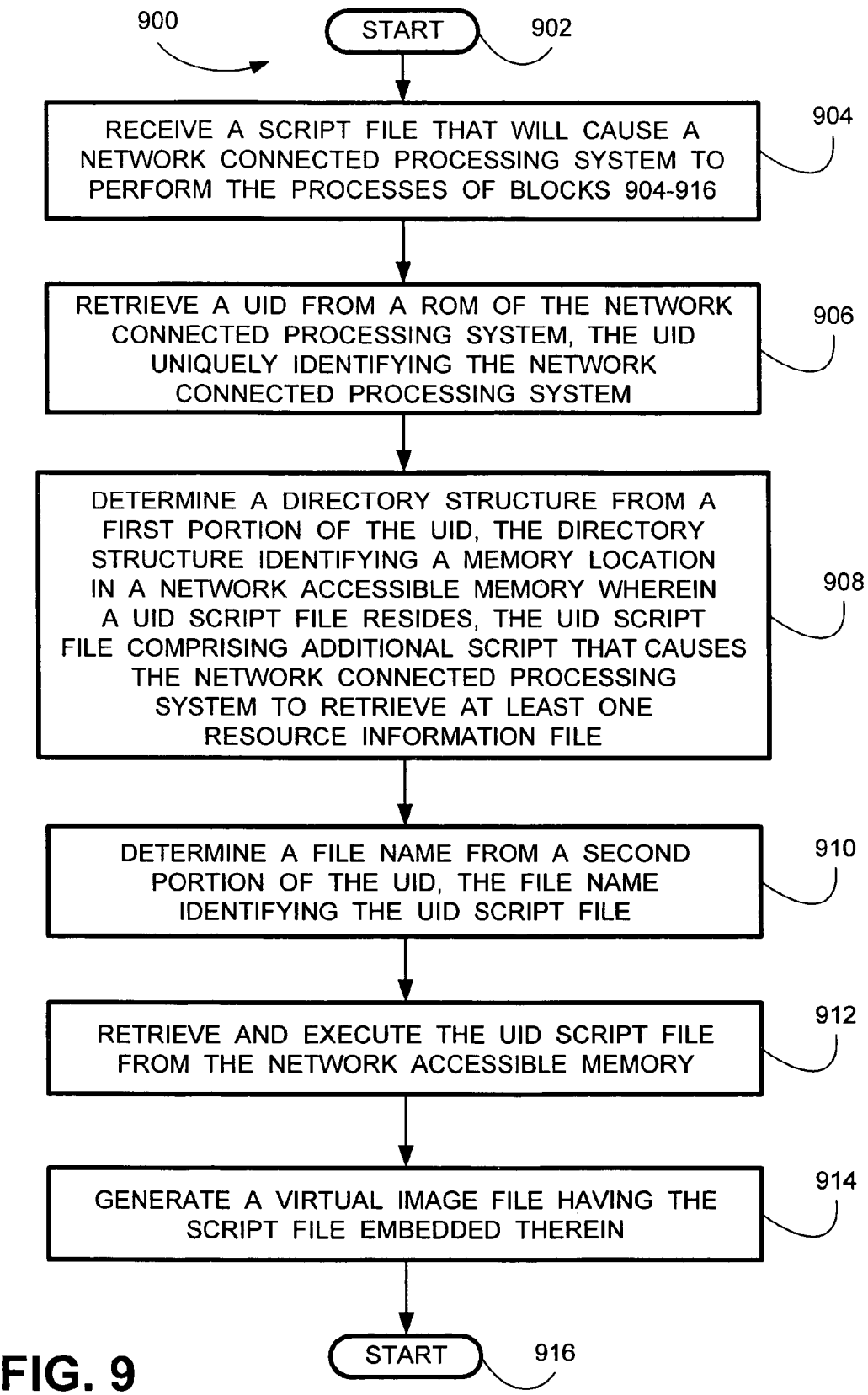

FIG. 5 is a block diagram illustrating in greater detail selected components of embodiments of a processing system 112 and a remote deployment server 106. Processing system 112 comprises a user interface (UL) memory 502, a UI NIC 504, UI processor 506, UI interface 508. UI NIC 504 provides connectivity between the processing system 112 and network 116. UI memory 502 comprises a hardware configuration tool 510 and the UUI 114.

The above-described components are communicatively coupled together via communication bus 514, via connections 516. In alternative embodiments of processing system 112, the above-described components are coupled in a different manner than illustrated in FIG. 5. For example, one or more of the above-described components may be directly coupled to UI processor 506 or may be coupled to UI processor 506 via intermediary components (not shown). In other embodiments, the processing system 112 and the remote deployment server 106 may be the same device.

User interface devices are used to receive instructions from the administrator. For example, display 518 and keyboard 520 are illustrated as coupled to the UI interface 508, via connections 522 and 524, respectively. Other user interface devices may be used depending upon the embodiment of the processing system 112. Connections 522 and 524 were illustrated as hardwire connections. Alternatively, connections 522 and/or 524 may be implemented with other suitable media, such as infrared, optical, wireless or the like.

Remote deployment server 106 comprises a remote deployment (RD) memory 526, RD processor 528 and RD NIC 530. RD NIC 530 provides connectivity between the processing system 112 and network 116. RD memory 526 further comprises the virtual image 534, with an embedded UEC 546, and the deployment program 548.

Virtual image 534 is an electronic version of a boot program for booting the target network connected processing system 104 (in the above-described illustrative example, the target network connected processing system device is identified with reference numeral 104-A). Thus, the virtual image 534 replaces a conventional image which must otherwise be manually inserted into a floppy drive of the target network connected processing system 104. As noted above, some types of target network connected processing system 104 do not include a floppy drive.

The above-described components are communicatively coupled together via communication bus 550, via connections 522. In alternative embodiments of remote deployment server 106, the above-described components are coupled in a different manner than illustrated in FIG. 5. For example, one or more of the above-described components may be directly coupled to RD processor 528 or may be coupled to RD processor 528 via intermediary components (not shown).

As noted above, the UUI 114 constructs a directory structure and a file name based upon the UID 118 (FIGS. 1-4) of the target network connected processing system 104. The hardware configuration tool 510 is used to provide script required by the UEC 546, which is constructed by the UUI 114. The UEC 546 is executable code executed by processor 404 (FIG. 4) during the boot process.

The UEC 546 is communicated to the remote deployment server 106. As part of the deployment program 548 operation, the received UEC 546 is embedded into the virtual image 534.

Returning to FIG. 4, when the target network processing system 104-A is initially started (booted), the hard drive memory 402 is initially empty and/or not partitioned. The execution SMBIOS 410 configures the NIC 408 and RAM 406, and executes the PXE (thereby generating the PXE request 412). The PXE request 412 is communicated to the remote deployment server 106. The remote deployment server 106, in response to receiving the PXE request 412, communicates the virtual image 534 (FIG. 5) to the target network processing system 104-A, which is stored in RAM 406.

As the virtual image 534 begins to self-execute, the UEC 546 (FIG. 5) is encountered. The UEC 546 begins to execute, causing the target network processing system 104-A to retrieve the UID 118 from ROM memory 120. Then, the UEC 546 causes the target network processing system 104-A to construct the directory 204 and file name 208 (FIG. 2) from the retrieved UID 118. The virtual image 534 also contains information identifying the network accessible memory 108. Network addresses or the like may be used.

Next, the target network processing system 104-A accesses the network accessible memory 108 and retrieves the UID script file 110-A. The UID script file 110-A provides information so that the target network processing system 104-A can retrieve the resource information file 302-A from the network accessible memory 108. As noted above, the resource information file 302-A contains resource information required by the target network processing system 104-A. As part of the boot process, the hard drive memory 402, which is initially empty, is configured. The retrieved resource information is loaded into the hard drive memory 402 and is then executed. The initial boot process is now complete.

During the next boot process, the hard drive memory 402 has been configured. Since the installed resource information is saved on the hard drive memory 402, the target network processing system 104-A can boot from its own hard drive memory 402.

Embodiments of the UUI 114 may be configured as a graphical user interface (GUI) based program. Some embodiments of the UUI 114 are configured as stand-alone programs that receive the UID 118 and pre-made script prepared by the hardware configuration tool 510 or from other sources. Other stand-alone embodiments are configured to automatically interface with the hardware configuration tool 510 and receive script prepared by the hardware configuration tool 510. Yet other embodiments are incorporated into the hardware configuration tool 510 as an integrated feature. Other embodiments of the UUI 114 are implemented in the remote deployment server 106, and/or may be incorporated into the deployment program 548, if the remote deployment server 106 is configured as a multi-purpose device with a user interface.

FIGS. 6-9 are flowcharts 600, 700, 800 and 900 illustrating various embodiments of process for initially booting a device using the UID. The flow charts 600, 700, 800 and 900 show the architecture, functionality, and operation of an embodiment for implementing the logic illustrated in the FIGS. 1-5 and described herein. Alternative embodiments implement the logic of flow charts 600, 700, 800 and 900 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in FIGS. 6-9, or may include additional functions, without departing from the functionality of the UID boot system 100 (FIG. 1). For example, two blocks shown in succession in any of the FIGS. 6-9 may in fact be substantially executed concurrently, the blocks may sometimes be executed in the reverse order, or some of the blocks may not be executed in all instances, depending upon the functionality involved, as will be further clarified hereinbelow. All such modifications and variations are intended to be included herein within the scope of the Specification.

The process of flow chart 600 begins at block 602. At block 604, a unique identifier (UID) is received, the UID uniquely identifying the network connected processing system. At block 606, a directory structure from a first portion of the UID is determined, the directory structure identifying a memory location in a network accessible memory wherein a UID script file resides, the UID script file comprising additional script that causes the network connected processing system to retrieve at least one resource information file. At block 608, a file name from a second portion of the UID is determined, the file name identifying the UID script file. The process ends at block 610.

The process of flow chart 700 begins at block 702. At block 704, a unique identifier (UID) is received that identifies the network connected processing system. At block 706, a first portion of the UID is selected to identify a directory structure. At block 708, a second portion of the UID is selected to identify a file name. At block 710, the directory structure is constructed on the network accessible memory. At block 712, a UID script file onto the constructed directory structure using the file name, wherein the UID script file identifies a memory location of at least a resource information file required by the network connected processing system. The process ends at block 714.

The process of flow chart 800 begins at block 802. At block 804, a virtual image is received from a remote located deployment server. At block 806, a unique identifier (UID) is retrieved from a read-only memory (ROM), the UID uniquely identifying the network connected processing system. At block 808, a directory structure is determined from a first portion of the UID, the directory structure identifying a memory location in a network accessible memory wherein a UID script file resides. At block 810, a file name from a second portion of the UID is determined, the file name identifying the UID script file. At block 812, the UID script file is retrieved from the network accessible memory. The process ends at block 814.

The process of flow chart 900 begins at block 902. At block 904, a script file is received that will cause the network connected processing system to perform the processes of blocks 906, 908, 910 and 912. At block 906, a unique identifier (UID) is retrieved from a read only memory (ROM) of the network connected processing system, the UID uniquely identifying the network connected processing system. At block 908, a directory structure is determined from a first portion of the UID, the directory structure identifying a memory location in a network accessible memory wherein a UID script file resides, the UID script file comprising additional script that causes the network connected processing system to retrieve at least one resource information file. At block 910, a file name is determined from a second portion of the UID, the file name identifying the UID script file. At block 912, the UID script file is retrieved and executed from the network accessible memory. At block 914, a virtual image file having the script file embedded therein is generated. The process ends at block 916.

Embodiments of the invention implemented in network accessible memory 108 (FIG. 1), UI memory 502 (FIG. 5), RD memory 526 (FIG. 5) and/or hard drive memory 402 (FIG. 4) may be implemented using any suitable computer-readable medium. In the context of this specification, a "computer-readable medium" can be any means that can store, communicate, propagate, or transport the data associated with, used by or in connection with the instruction execution system, apparatus, and/or device. The computer-readable medium can be, for example, but not limited to, an electronic, magnetic, optical, electromagnetic, infrared, or semiconductor system, apparatus, device, or propagation medium now known or later developed.

Network 116 may be any type of suitable communication system. Non-limiting examples of network 116 include standard telephony systems, frame relay based systems, internet or intranet systems, local access network (LAN) systems, Ethernet systems, cable systems, a radio frequency (RF) systems, cellular systems, or the like. Furthermore, network 116 may be a hybrid system comprised of one or more of the above-described systems.

Network accessible memory 108 may be any suitable network interconnected memory device that may be accessed by the targeted network processing system 104 during the booting process. Furthermore, the UID script file may reside in a first network accessible memory and the resource information file may reside in a second network accessible memory.

Other embodiments of the UID boot system 100 may be used to reconfigure a network connected processing system. For example, hardware in the network connected processing system may need to be reconfigured. The information to perform the above modification may reside in a resource information file. Accordingly, the UID of the network connected processing system can be used to identify location of a UID script file that causes the network connected processing system to retrieve the information.

It should be emphasized that the above-described embodiments are merely examples of the disclosed system and method. Many variations and modifications may be made to the above-described embodiments. All such modifications and variations are intended to be included herein within the scope of this disclosure and protected by the following claims.

Therefore, at least the following is claimed:

1. A method for remotely initially configuring a network connected processing system, comprising:

receiving a unique identifier (UID), the UID uniquely identifying the network connected processing system;

determining a directory structure from a first portion of the UID, the directory structure identifying a memory location in a network accessible memory wherein a UID script file resides, the UID script file comprising additional script that causes the network connected processing system to retrieve at least one resource information file; and determining a file name from a second portion of the UID, the file name identifying the UID script file.

2. The method of claim 1, further comprising:
retrieving the UID script file from the network accessible memory;
executing the UID script file to initiate a boot process; and
retrieving the resource information file specified by the executed UID script file.

3. The method of claim 1, further comprising communicating the UID script file from the network accessible memory to the network connected processing system over a communication system.

4. The method of claim 1, further comprising retrieving the UID from a read-only memory (ROM) residing in the network connected processing system.

5. A method remotely initially configuring network connected processing system, comprising:
receiving a unique identifier (UID) that identifies the network connected processing system;
selecting a first portion of the UID to identify a directory structure;
selecting a second portion of the UID to identify a file name;
constructing the directory structure on a network accessible memory; and
saving a UID script file onto the constructed directory structure using the file name, wherein the UID script file identifies a memory location of at least a resource information file required by the network connected processing system.

6. The method of claim 5, further comprising specifying script that causes the network connected processing system to retrieve the resource information file during an initial boot process, the specified script residing in the UID script file.

7. The method of claim 5, wherein selecting the first portion of the UID further comprises:
selecting a sub-portion of the first portion to define a main directory; and
selecting another sub-portion of the first portion to define a sub-directory,
wherein the constructed directory structure identifies the UID script file by at least the main directory and the sub-directory.

8. The method of claim 5, wherein receiving the UID comprises receiving a Universally Unique Identifier (UUID).

9. The method of claim 5, wherein receiving the UID comprises receiving a Globally Unique Identifier (GUID).

10. A method for initially configuring network connected processing system, comprising receiving a script file that will cause the network connected processing system to:
retrieve a unique identifier (U ID) from a read only memory (ROM) of the network connected processing system, the UID uniquely identifying the network connected processing system;
determine a directory structure from a first portion of the UID, the directory structure identifying a memory location in a network accessible memory wherein a UID script file resides, the UID script file comprising additional script that causes the network connected processing system to retrieve at least one resource information file;
determine a file name from a second portion of the UID, the file name identifying the UID script file;
retrieve and execute the UID script file from the network accessible memory; and
generating a UID extension command (UEC) file having the script file embedded therein.

11. The method of claim 10, further comprising:
receiving a Pre-Boot Execution Environment (PXE) request from the network connected processing system when the network connected processing system is initially booted; and
communicating a virtual image file to the network connected processing system in response to receiving the PXE request.

12. The method of claim 11, further comprising remotely initiating an initial boot process of the network connected processing system such that the PXE request is generated by the network connected processing system.

13. The method of claim 10, wherein receiving the UID comprises receiving a Universally Unique Identifier (UUID).

14. The method of claim 10, wherein receiving the UID comprises receiving a Globally Unique Identifier (GUID).

15. A method for booting a network connected processing system, comprising:
receiving a virtual image from a remote located deployment server;
retrieving a unique identifier (UID) from a read-only memory (ROM), the UID uniquely identifying the network connected processing system;
determining a directory structure from a first portion of the UID, the directory structure identifying a memory location in a network accessible memory wherein a UID script file resides;
determining a file name from a second portion of the UID, the file name identifying the UID script file; and
retrieving the UID script file from the network accessible memory.

16. The method of claim 15, wherein the virtual image comprises script that causes the network connected processing system to retrieve the UID, determine the directory structure, determine the file name and retrieve the UID script file.

17. The method of claim 15, further comprising:
retrieving and executing a System Management Basic Input/Output System (SMBIOS) program; and
communicating a Pre-Boot Execution Environment (PXE) request to the remote located deployment server, wherein the virtual image is received from the remote located deployment server in response to the PXE request.

18. The method of claim 17, wherein the retrieving and executing the SMBIOS program further comprises configuring a network interface card (NIC) coupled to a network, such that the Pre-Boot Execution Environment (PXE) request is communicated via the NIC and such that the virtual image is received via the NIC.

19. The method of claim 15, further comprising retrieving a resource information file from a second network accessible memory using location information specified in the retrieved UID script file.

20. A system for booting devices, comprising:
a network connected processing system that requires resource information to complete an initial booting process, the network connected processing system identified by a unique identifier (UID);

a user interface processing system configured to:
  generate a file directory using a first portion of the UID, the file directory identifying a location of a UID script file;
  generate a name of the UID script file using a second portion of the UID; and
  generate a UID extension command (UEC);

a network accessible memory wherein the UID script file is stored, the location of the UID script file identified by the file directory; and a remote deployment server that communicates a virtual image to the network connected processing system in response to receiving a Pre-Boot Execution Environment (PXE) request from the network connected processing system during the booting process, wherein the UEC is embedded in the virtual image.

21. The system of claim 20, further comprising a network, the network communicatively coupling the network connected processing system, the user interface processing system, the network accessible memory and the remote deployment server.

22. The system of claim 20, wherein the resource information resides in a second file in the network accessible memory; wherein the UID script file identifies a second location of the second file; and wherein the UID script file causes the network connected processing system to retrieve the second file from the second location.

23. The system of claim 22, wherein the second file resides in the network accessible memory at the second location.

24. The system of claim 22, further comprising a second network accessible memory, wherein the second file resides in the second network accessible memory at the second location.

25. A system for booting a network connected processing system, comprising:
  means for starting initial booting of a processor residing in the network connected processing system;
  means for retrieving and executing a System Management Basic Input/Output System (SMBIOS) program from a read-only memory (ROM) residing in the network connected processing system;
  means for receiving a virtual image from a remote deployment server, the virtual image comprising script configured to cause operation of:
    means for retrieving a unique identifier (UID) from the ROM, the UID uniquely identifying the network connected processing system;
    means for determining a directory structure from a first portion of the UID, the directory structure identifying a memory location in a network accessible memory wherein a UID script file resides, the UID script file comprising additional script that causes the network connected processing system to retrieve at least one resource information file;
    means for determining a file name from a second portion of the UID, the file name identifying the UID script file; and
    means for retrieving and executing the UID script file from the network accessible memory.

26. The system of claim 25, further comprising means for retrieving a resource information file specified by the executed UID script file.

27. The system of claim 25, further comprising means for communicating a Pre-Boot Execution Environment (PXE) request to the remote deployment server, wherein the virtual image is received in response to the communicated PXE request.

28. A system for identifying location of resource information residing in a network accessible memory, comprising:
  means for receiving a unique identifier (UID) that uniquely identifies a network connected processing system;
  means for specifying a directory structure using a first portion of the UID;
  means for specifying a UID script file name using a second portion of the UID;
  means for generating a script file, the script file configured to cause the network connected processing system to:
    retrieve the UID that uniquely identifies the network connected processing system, construct the directory structure using the first portion of the UID;
    construct the UID script file name using the second portion of the UID;
    retrieve a UID script file from the network accessible memory, wherein the UID script file resides in the location corresponding to the directory structure and the UID script file name;
    retrieve the resource information from the network accessible memory, wherein the resource information resides in a second location specified by the UID script file; and
  means for communicating the script file to a remote deployment server that constructs a virtual image wherein the script file resides.

29. The system of claim 28, further comprising:
  means for generating the UID script file;
  means for causing the network accessible memory to construct the specified directory structure; and
  means for causing the network accessible memory to save the UID script file in the specified directory structure using the specified UID script file name.

30. A program for booting a device stored on computer-readable storage medium, the program comprising instructions executed by the device, the program comprising:
  a first instruction for receiving a unique identifier (UID), the UID uniquely identifying the device;
  a second instruction for determining a directory structure from a first portion of the received UID corresponding to the first instruction, the directory structure identifying a memory location in a network accessible memory wherein a UID script file resides, the UID script file comprising additional script that causes the device to retrieve at least one resource information file; and
  a third instruction for determining a file name from a second portion of the received UID corresponding to the first instruction, the file name identifying the UID script file.

31. The program of claim 30, further comprising:
  a forth instruction for retrieving and executing the UID script file from the network accessible memory; and
  a fifth instruction for retrieving the resource information file specified by the executed UID script file.

32. The program of claim 30, further comprising a sixth instruction for retrieving the unique identifier (UID) from a read-only memory (ROM) residing in the device.

* * * * *

UNITED STATES PATENT AND TRADEMARK OFFICE
CERTIFICATE OF CORRECTION

| | |
|---|---|
| PATENT NO. | : 7,293,168 B2 |
| APPLICATION NO. | : 11/014014 |
| DATED | : November 6, 2007 |
| INVENTOR(S) | : Masato Maeda et al. |

It is certified that error appears in the above-identified patent and that said Letters Patent is hereby corrected as shown below:

In column 7, line 25, delete "(UL)" and insert -- (UI) --, therefor.

In column 11, line 60, in Claim 10, delete "(U ID)" and insert -- (UID) --, therefor.

Signed and Sealed this

Thirteenth Day of May, 2008

JON W. DUDAS
*Director of the United States Patent and Trademark Office*